United States Patent [19]

White et al.

[11] Patent Number: 4,637,936

[45] Date of Patent: Jan. 20, 1987

[54] ASPETIC FOOD PROCESSING APPARATUS AND METHOD

[75] Inventors: James E. White, Overland Park, Kans.; Lewis F. Alley, Kansas City, Mo.; James E. Anderson, Shawnee Mission, Kans.; Jackie D. Birdsell, Kansas City, Mo.

[73] Assignee: Marlen Research Corporation, Overland Park, Kans.

[21] Appl. No.: 639,955

[22] Filed: Aug. 10, 1984

[51] Int. Cl.⁴ .......................... A23L 3/18; F25B 29/00
[52] U.S. Cl. ...................................... 426/523; 99/355; 99/470; 165/65; 426/521
[58] Field of Search ............... 426/523, 520, 521, 231; 99/352, 355, 470; 165/65; 422/32, 36; 17/38; 137/569; 417/345, 286, 531, 533

[56] References Cited

U.S. PATENT DOCUMENTS

| | | | |
|---|---|---|---|
| 3,456,285 | 7/1969 | Miller et al. | 17/39 |
| 3,846,570 | 11/1974 | Vetter et al. | 426/521 |
| 4,097,962 | 7/1978 | Alley et al. | 17/38 |
| 4,424,236 | 1/1984 | Campbell | 426/231 |

*Primary Examiner*—George Yeung
*Attorney, Agent, or Firm*—Schmidt, Johnson, Hovey & Williams

[57] ABSTRACT

A greatly improved aseptic processing apparatus and method for pumpable foods is provided which gives accurate, uniform aseptic cooking conditions (e.g, time, temperature and pressure) while at the same time preserving the integrity of particulates in the food product. In preferred forms, the apparatus includes a reciprocating piston food pump which generates a continuous product stream at a substantially constant nominal pressure. This stream is fed to a heat exchanger in order to elevate the temperature of the product, whereupon the stream passes through a holding tube to complete the aseptic cooking process. A metering device such as a rotary pump is located downstream of the holding tube for creating a substantially constant flow rate of product from the apparatus. Use of a downstream metering device in conjunction with an upstream constant pressure pump permits attainment of even, relatively high system pressures which in turn facilitates accurate temperature control and eliminates localized internal steam flashing which can deleteriously affect product quality. By virtue of the present apparatus and method, aseptic processing of low acid heterogeneous food products such as stews and chilies can be safely accomplished on a commercial scale.

17 Claims, 3 Drawing Figures

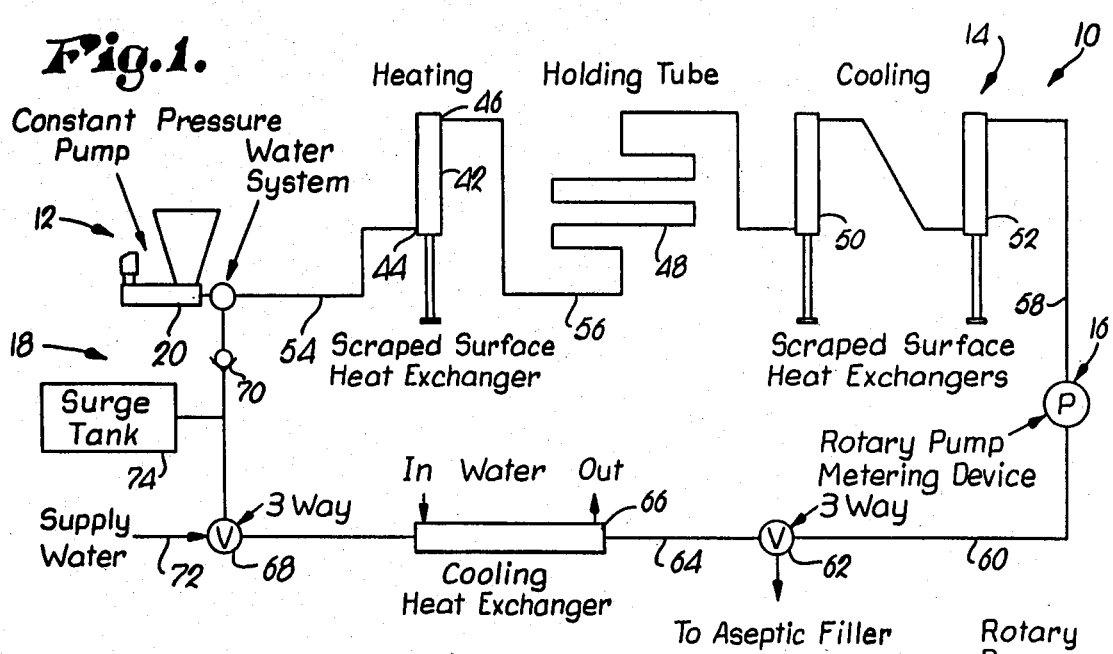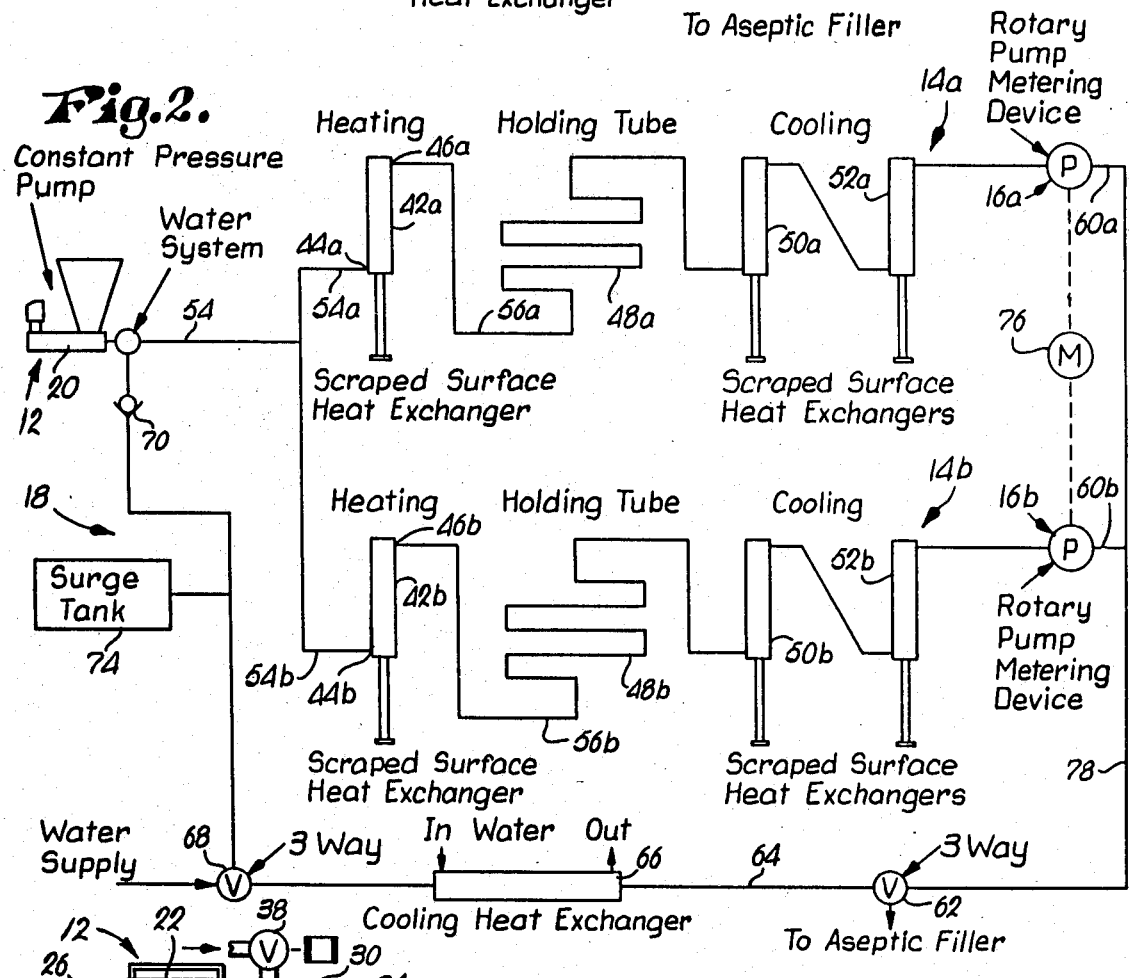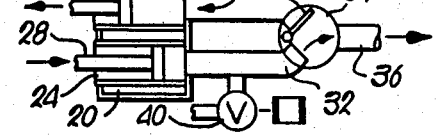

ASPETIC FOOD PROCESSING APPARATUS AND METHOD

BACKGROUND OF THE INVENTION

1. Field of the Invention

The present invention is broadly concerned with a significantly improved method and apparatus for aseptic processing of pumpable foods, and particularly low acid foods of heterogeneous consistency. More particularly, it is concerned with such a method and apparatus which makes use of a metering device downstream of the heat exchanger and holding tube in order to create a constant flow rate of the product, in conjunction with an initial upstream device for generating a stream of the food product at a substantially constant pressure.

2. Description of the Prior Art

Traditional food preparation and canning processes on a commercial scale involve initially filling a can with the desired food product, followed by sealing of the can and retorting under elevated temperatures and pressures for a sufficient period of time to thoroughly cook the canned product. Such processes have been used for many years, but present a number of significant difficulties. For example, the cost involved in such canning procedures is considerable, not only from the standpoint of energy consumption, but also by virtue of the fact that a wide variety of costly cans must be stocked for filling during the canning season. Further, the rather severe retorting conditions required to cook canned products inevitably tends to degrade the organoleptic properties of the food (e.g., taste, color and particulate identity).

As a consequence, food processors have in the past investigated improved methods of processing foods in order to improve the nutritional and organoleptic properties of the food, while reducing costs. One proposal has been to make use of so-called aseptic processing and packaging. Broadly speaking, such processing involves continuous cooking of a food product prior to packaging in order to sterilize the food, followed by packaging under sterile conditions. Aseptic techniques for processing food were originally developed in the 1940's, but only in recent years have processors begun to widely employ the techniques. The advantages of aseptic processing are many, such as reduced energy and packaging costs, relatively high processing rates, and in some instances the ability to improve organoleptic properties of the food as compared with conventional canning procedures.

Presently, aseptic processing of food is primarily directed to products which are of a homogeneous or fluid nature, such as puddings and juices. Further, many of these products are of the high acid variety (pH below 4.6) where cooking temperatures and holding times are relatively low and there are only negligible health hazards attendant to improper processing.

Aseptic processing of such homogeneous, high acid products generally involves use of a pressurized and sterilized system comprising an initial positive displacement type pump which is used to meter a continuous stream of the food product to a processing section. The latter includes one or more elongated heat exchangers, an intermediate holding tube, and finally a series of cooling heat exchangers. A pneumatic back pressure valve is typically provided downstream of the processing section in order to create a restriction and generate system pressures.

Government regulations covering aseptic processing mandate that sterilization of the product stream is to be determined by the time-temperature conditions in the holding tube. Thus, the time the product is in the initial heat exchanger to bring it up to the sterilization temperature, and the time the product is in any other piping, must be ignored. Hence, in order to establish a safe, commercially viable process, the accuracy of the time-temperature relationship in the holding tube area is of paramount importance.

The government regulations also presently specify that the metering pump shall be located upstream of the holding tube, and shall be operated to maintain the required rate of product flow. Thus, all prior systems meter (i.e., establish substantially constant flow rates of the product regardless of pressure changes) at the upstream end of the processing system ahead of the initial heat exchangers and holding tube.

While systems as described above give acceptable results in the case of high acid, homogeneous products, they are extremely deficient in the case of low acid, heterogeneous products such as soups, stews and chilies. For example, the presence of a back pressure valve cannot be tolerated with non-homogeneous foods, because such valves create a considerable restriction and particulates passing through the valves are inevitably degraded, sometimes to the point of a mush. Thus, other types of equipment have been proposed for use in connection with low acid heterogeneous foods. In one proposal, a rotary positive displacement pump is employed in lieu of the back pressure valve downstream of the processing section, with the downstream pump being operated at a slower speed than the initial metering pump, thereby creating system pressure. Another idea has been to employ a pressurized aseptic surge tank for purposes of pressure generation. Both of these approaches, while theoretically applicable to the aseptic processing of low acid heterogeneous food products, have serious deficiencies. Indeed, these problems are so formidable that there are at present no commercial installations in operation wherein low acid, heterogeneous products are being aseptically processed. This is the case even though there is widespread interest in developing such processes and equipment, for obvious commercial reasons.

A principal problem with the above outlined approaches is the fact that they all involve metering product flow at the upstream end of the apparatus prior to the cooking and holding tube sections. Metering in this context refers to creation of constant product flow rates, regardless of pressure conditions. In any commercial operation though, normal product variations will cause the metering pump to increase or decrease system pressures in order to maintain constant flow rates; thus pressure variations are inevitable. This is significant inasmuch as such pressure fluctuations can lead to localized flashing of steam in the cooking heat exchanger(s). That is to say, it is the conventional practice to operate at system pressures slightly greater (e.g., 10–15 psi) than the pressure required to prevent steam flashing at the cooking temperature being employed. However, if system pressures fluctuate widely, as can occur with upstream metering pumps, conditions can be produced where, in localized regions in the cooking apparatus, pressures are insufficient to prevent flashing. As a result, steam flashes and the product "boils" within the cooking apparatus. This not only disrupts the desirable smooth, continuous flow of product through the apparatus, but moreover can tend to degrade particulate materials. More important, such flashing can disrupt the important time-temperature relationship necessary for proper aseptic cooking, and even lead to an unsterile product.

One possible solution to this problem would be to simply raise system pressures to a point which would clearly compensate for any normal pressure fluctuations encountered in typical operation. However, this proposal creates another difficult problem, because creation of such high pressures using conventional equipment usually results in rather severe processing conditions and hence product degradation. Therefore, the processor is faced with a dilemma when use is made of a constant flow rate metering pumps upstream of the cooking and holding tube apparatus. On the one hand, if system pressures are maintained only slightly above the flash pressure, localized flashing can occur because of pressure fluctuations which are the inevitable by-product of upstream metering. On the other hand, if relatively high pressures are used which would normally preclude any localized flashing this in and of itself can cause product degradation.

SUMMARY OF THE INVENTION

The present invention overcomes the problems noted above, and provides a significantly improved method and apparatus for the aseptic processing of pumpable foods, and particularly low acid, heterogeneous food such as soups, stews and chilies. Broadly speaking, the present invention provides an apparatus for continuously and aseptically processing and cooking a pumpable food product under pressure. The apparatus includes means such as a positive pressure pump for delivering a continuous stream of product at a substantially constant pressure, along with a continuous processing assembly coupled with the constant pressure delivery means. The processing assembly has means such as an indirect heat exchanger for heating the continuous pressurized stream of product to a desired processing temperature, and structure downstream of the heating means for holding the heated and pressurized steam for a period of time to assure aseptic cooking of the product. Finally, the overall apparatus has metering means operatively connected with the processing assembly downstream of the holding structure in order to create a substantially constant flow rate of product from the apparatus.

In particularly preferred forms, the constant pressure pumping device preferably comprises a reciprocating piston pump. Particularly advantageous results have been obtained with the use of a dual piston pump commercialized by Marlen Research Corporation of Overland Park, Kans. Such a pump can be operated in a constant pressure or constant flow rate mode, but for purposes of the present invention the pumping device is operated in the constant pressure mode. The Marlen pumping device is depicted in U.S. Pat. No. 4,097,962, and such patent is expressly incorporated by reference herein.

The product heating means preferably includes one or more indirect heat exchangers for bringing the continuous pressurized stream of food product into indirect thermal heat exchange with a heating medium such as externally applied steam, in order to heat the product stream to the desired cooking temperature. A variety of indirect heat exchangers can be used in this context, but for many purposes it has been found that scraped surface heat exchangers are most appropriate.

The holding structure forming a part of the overall processing assembly is of conventional construction, and basically comprises an elongated holding tube sized to retain the continuously moving stream therein for a period of time to assure proper aseptic processing and sterilization of the food product.

In addition to the foregoing, the processing assembly typically includes means for cooling the product after passage through the holding tube. Here again, indirect heat exchangers are advantagously employed, and in this instance the external media is usually cold water.

As noted above, the downstream metering device preferably is in the form of a rotary pump, such as those available from the Waukesha Foundry Division, Abex Corporation. The function of the metering device is to create a substantially constant flow rate of the aseptically cooked product downstream of the holding zone. This downstream metering device, in conjunction with the upstream constant pressure pumping unit, is primarily responsible for the advantageous results achieved by the present invention.

BRIEF DESCRIPTION OF THE DRAWINGS

FIG. 1 is a schematic representation of an aseptic processing apparatus in accordance with the present invention;

FIG. 2 is a schematic representation similar to that of FIG. 1, but shows use parallel processing legs in the aseptic treatment apparatus; and FIG. 3 is a schematic, fragmentary view illustrating the preferred reciprocating piston pumping apparatus being used during water sterilization of the system prior to actual food processing.

DESCRIPTION OF THE PREFERRED EMBODIMENTS

Turning now to the drawing, and particularly FIG. 1, aseptic processing apparatus 10 broadly includes and upstream constant pressure pump 12 designed to generate a continuous stream of product at a substantially constant pressure, continuous processing assembly 14, a downstream metering device 16, and finally a water sterilization system broadly referred to by the numeral 18. In more detail, the pump 12 depicted in FIG. 1 is of the type described in U.S. Pat. No. 4,097,962. This pump (see FIG. 3) includes a hopper 20 with a pair of reciprocable, side-by-side tubular sleeves 22, 24 therein. A hydraulically operated piston 26, 28 is positioned with a corresponding sleeve 22, 24. At the outlet end of the hopper 20 a pair of delivery pipes 30, 32 are provided, with the pipes being in communication with the respective sleeves 22, 24. A diverter valve 34 is provided at the outer ends of the pipes 30, 32, and has an outlet pipe 36 for delivery of material from the pumping apparatus. The device depicted in FIG. 3 also includes a pair of pneumatically operated water valves 38, 40, which are operatively connected to the corresponding pipes 30, 32; the importance of these valves 38, 40 will be explained hereinafter.

The processing assembly 14 includes one or more scraped surface heat exchangers 42 of conventional design which include a product inlet 44 and a product outlet 46. In addition, the exchanger(s) include an external jacket along with means for passing steam or other heat exchange media through the jackets in order to heat the product passing through the interior of the exchanger. Such scraped surface exchangers are of course conventional, and can be purchased from a variety of sources.

The assembly 14 further includes an elongated holding tube 48 which is sized to retain product for a period of time to assure aseptic cooking thereof. Here again though, the holding tube structure is completely conventional and well known to those skilled in the art.

The assembly 14 has cooling apparatus downstream of the holding tube 48, and in the form shown includes a series of scraped surface heat exchangers 50, 52 which are connected in series as shown. The cooling exchangers include means (not shown) for passing a cooling medium such as cold water through external jackets, in order to effectively cool the product passing therethrough.

As described above, the pump 12 is designed to deliver a continuous stream of product at a substantially constant pressure of the assembly 14. For this purpose, appropriate piping 54 is provided between the outlet 36 of the pump 12, and the inlet 44 of the cooking heat exchanger(s) 42. In like manner, piping 56 is provided between the outlet of the exchanger(s) 42 and the inlet of holding tube 48, with additional piping as needed to interconnect the outlet end of holding tube 48 to the cooling exchangers 50, 52. Finally, and outlet pipe 58 from the exchangers 50, 52 is provided in order to deliver cooled and aseptically processed product to metering pump 16.

The pump 16 is connected to pipe 58 as illustrated, and is further connected via pipe 60 to a three-way valve 62. As illustrated in FIG. 1, the valve 62 can be opened to deliver processed food product to conventional aseptic filling equipment. Inasmuch as the pump 16 operates to meter product flow, i.e., to assure that flow rate of the product is substantially constant, the product is delivered at a consistent rate through pipe 60 and valve 62 to the filling equipment.

The apparatus depicted in FIG. 1 also includes the water sterilization system 18. For this purpose, piping 64 is provided between valve 62 and the water valves 38, 40 associated with pump 12. The piping 64 passes through an indirect cooling heat exchanger 66, and also has a three-way valve 68 and a check valve 70 interposed therein. Finally, a source of water 72 is connected to valve 68, and a surge tank 74 is operatively connected to piping 64 between valve 68 and check valve 70.

In the operation of apparatus 10, sterilization is accomplished by making use of the system 18. In this operational mode, the pump 12 is employed as a water pump. To this end, the sleeves 22, 24 (see FIG. 3) are extended and locked in place within hopper 20, and valve 68 is opened to permit water flow from supply 72 to the pump 12. The valve 62 is opened so as to communicate pipes 60 and 64. During the water sterilization sequence, the valves 38, 40 are sequentially opened and closed during reciprocation of the pistons 26, 28 in order to first draw charges of water into each of the sleeves 22, 24, whereupon these charges are expelled through the pipes 30, 32 by virtue of the movement of the pistons. Sufficient water is pumped in this fashion to fill the system.

The pumped water during circulation is heated within the exchanger(s) 42, and is passed through the holding tube 48 and cooling exchangers 50, 52. The water then passes through pipe 58 and pump 16 for ultimate passage through exchanger 66, where it is cooled by indirect heat exchange with cooling medium such as cold water. In some cases it is believed that the exchanger 60 can be omitted.

After the sterilizing sequence is completed (which typically takes 30 minutes using 290° F. water), the system is preheated and sterile, and is ready to receive product. At this point the water system is shut down, and product is directed to the pump 12. In this mode of operation, the sleeves 22, 24 reciprocate in timed relationship within the hopper 20, in order to sequentially fill the sleeves with food product. When filled, the pistons 26, 28 then operate to expel the product through the delivery pipes 30, 32, and valve 34, to the processing assembly 14. As noted, during pumping of the food product, the pump 12 is placed in a constant pressure mode, so as to generate a continuous stream of the product at a substantially constant pressure. In practice, with the use of the preferred Marlen pump, it has been found that pressure conditions can be maintained at a level of no more than about ±5 psi from a desired nominal pressure. Usually, system pressures of about 50-150 psi are preferred.

In any event, the constant pressure stream of product is first passed through the heating exchanger(s) 42 whereupon the product is heated to a desired temperature, which in the case of low acid foods is usually from about 270°-300° F. After heating the exchanger(s), the product passes through piping 56 to holding tube 48. The latter is sized so as to retain the continuously moving stream of product within the tube at the cooking temperature for a period of time sufficient to assure aseptic cooking. Broadly speaking, this time will range from about 10 seconds to 20 minutes, with the majority of the processing involving hold times of from about 30 seconds to 1½ minutes.

After leaving the holding tube 48, the cooked product passes through the cooling exchangers 50, 52, whereupon the product is cooled to a desired packaging temperature, typically 70°-80° F. The cooled product then passes through piping 58 through metering pump 16, which assures a constant flow of the aseptically cooked product from the assembly 14. At this point, the product passes through valve 62 (which is open for this purpose) to the aseptic filling equipment (not shown).

FIG. 2 depicts another embodiment of the invention wherein a single pump 12 is used to feed two processing assembly legs 14a and 14b which are arranged in parallel. Inasmuch as the respective legs 14a and 14b are for the most part identical with apparatus 14 described in connection with FIG. 1, similar reference numerals have been applied, except for "a" and "b" denotations. In all cases, the similarly numbered equipment is identical with that described with reference to FIG. 1. In any event, it will be seen that the single pump 12 is connected via piping 54, 54a and 54b to the parallel legs 14a and 14b. Thus, respective sub-streams of product are passed through each of the processing legs 14a and 14b for cooking, holding and cooling as described. Each of the processing legs is further provided with a rotary pump metering device 16a or 16b, which performs the same function as pump 16 described in connection with FIG. 1. However, a single electric motor 76 is provided to operate both of the pumps 16a and 16b. In this fashion, the pumps operate at essentially the same speed, thereby insuring that product flow rates from the processing legs 14a and 14b are essentially identical. Further, in view of the fact that a single pump 12 is employed, pressure conditions throughout the legs 14a and 14b are substantially constant. Product from the output of the pumps 16a and 16b passes through piping 60a and 60b to a common delivery pipe 78. The valve 62 is interposed in the pipe 78, and accordingly product delivered from the parallel processing legs 14a and 14b passes through the valve 62 to the aseptic filling equipment.

It will also be seen that the apparatus of FIG. 2 is provided with a water sterilizing system 18. Here again, and with reference to FIG. 1, like parts have been similarly numbered, and the operation of the water system of the FIG. 2 apparatus is identical as compared with that of FIG. 1.

Actual testing with apparatus in accordance with the invention has demonstrated consistently good results can be obtained when processing low acid heterogeneous food products such as stews and other particulate-containing foods. In one series of tests, a Marlen Model 700 twin piston pump with hopper and hydraulic drives was employed as the upstream constant pressure pump, whereas Alfa-Laval scraped surface indirect heat exchangers were used for cooking (steam media) and cooling (cold water media). Waukesha 133A or 25RF (without hopper) positive displacement pumps were employed as metering devices. The holding tube had a 2 inch diameter, a total length of 9.2 feet (upward slope) and a capacity of 0.174 cubic feet. Products tested included beef stew, noodles and chicken, seafood nueberg, and sweet and sour pork. Several of the products produced during this testing were found to be equal to or better than conventional retorted canned controls. This was especially true with such quality factors as flavor, texture, particulate identity and structural integrity. While particulate color was generally superior with products produced according to the present invention as compared with the retorted samples, the sauces or gravies of the former were found to be considerably lighter in color. A cooking temperature of 290° F. was used in the tests, whereas pressure conditions were maintained within the range of about 100 to 120 psig. Holdup time in the holding tube was 1 minute.

Although the preferred metering device used in the invention is a rotary pump, the invention is not so limited. In alternative forms, use can be made of a volumetric filling device in lieu of the rotary pump in order to provide the constant flow rate.

We claim:

1. Apparatus for continuously and aseptically processing and cooking a pumpable food product under pressure, said apparatus comprising:
   constant pressure pump means for delivering a continuous stream of said product at a substantially constant pressure notwithstanding variations in processing conditions downstream of said pump means which would induce pressure variations in said stream;
   a continuous processing assembly operably coupled with said constant pressure delivery means and including means for heating said continuous pressurized stream of product to a desired processing temperature, and structure downstream of said heating means for holding said heated and pressurized stream for a period of time to assure aseptic cooking of the product stream; and
   metering means operatively connected with said assembly downstream of said holding structure for creating a substantially constant flow rate of product from the apparatus.

2. Apparatus as set forth in claim 1, said pump means comprising a constant pressure reciprocating piston pump.

3. Apparatus as set forth in claim 1, said heating means comprising an indirect heat exchanger for bringing said continuous pressurized stream of product, and a heating medium, into indirect thermal interchange in order to heat said product stream to said desired temperature.

4. Apparatus as set forth in claim 3, said heat exchanger comprising a scraped surface indirect heat exchanger.

5. Apparatus as set forth in claim 1, said holding structure comprising an elongated holding tube connected to said heating means for receiving said heated and pressurized stream therefrom.

6. Apparatus as set forth in claim 1, said processing assembly including means downstream of said holding structure for cooling said continuous product stream.

7. Apparatus as set forth in claim 6, said cooling means comprising one or more indirect heat exchangers.

8. Apparatus as set forth in claim 1, said metering means comprising a rotary pump metering device.

9. Apparatus as set forth in claim 1, including a water sterilization system operably coupled to said delivery means and processing assembly for selective passage of sterilizing water through said assembly.

10. Apparatus as set forth in claim 1, said processing assembly comprising a plurality of processing assembly legs arranged in parallel and operably coupled to said delivery means, each of said legs including means for heating a continuous pressurized sub-stream of said product to a desired processing temperature, and structure downstream of the heating means for holding said heated and pressurized sub-stream for a period of time to assure aseptic cooking of the sub-stream.

11. A method of continuously and aseptically processing and cooking a pumpable food product, comprising the steps of:
   passing said product through constant pressure pump means for generating a substantially constant pressure stream of said product notwithstanding variations in processing conditions downstream of said pump means which would induce pressure variations in said stream;
   heating said continuous, pressurized stream of product to a desired processing temperature;
   holding said heated and pressurized stream in a holding zone for a period of time to assure aseptic cooking thereof; and
   passing said cooked stream through metering means to meter the flow of said stream and create a substantially constant flow rate of the aseptically cooked product downstream of the holding zone.

12. The method as set forth in claim 11, including the step of pressurizing said continuous stream to a level of from about 50-150 psi.

13. The method as set forth in claim 11, including the step of maintaining said stream at a pressure of no more than about ±5 psi from a desired nominal pressure.

14. The method as set forth in claim 11, said pump means comprising a constant pressure reciprocating pump.

15. The method as set forth in claim 11, including the step of heating said continuous pressurized stream to a temperature of from about 270°-300° F.

16. The method as set forth in claim 11, said heating step being carried out by passing said continuous pressurized stream in indirect thermal interchange relationship with a heating medium.

17. The method as set forth in claim 11, including the step of holding said heated and pressurized stream in said zone for a period of from about 10 seconds to 20 minutes.

* * * * *